United States Patent
McCorkendale et al.

(10) Patent No.: US 8,225,053 B1
(45) Date of Patent: Jul. 17, 2012

(54) METHOD AND APPARATUS FOR MITIGATING PERFORMANCE IMPACT OF BACKGROUND PROCESSING ON INTERACTIVE APPLICATION

(75) Inventors: Bruce McCorkendale, Manhattan Beach, CA (US); Mark W. Spiegel, West Hills, CA (US); Paul Agbabian, Los Angeles, CA (US); Shaun Cooley, El Segundo, CA (US)

(73) Assignee: Symantec Corporation, Mountain View, CA (US)

( * ) Notice: Subject to any disclaimer, the term of this patent is extended or adjusted under 35 U.S.C. 154(b) by 485 days.

(21) Appl. No.: 12/004,865

(22) Filed: Dec. 21, 2007

Related U.S. Application Data

(60) Provisional application No. 60/976,418, filed on Sep. 29, 2007.

(51) Int. Cl.
G06F 12/00 (2006.01)
(52) U.S. Cl. ................................. 711/159; 711/E12.069
(58) Field of Classification Search .................. 711/159, 711/E12.069
See application file for complete search history.

(56) References Cited

U.S. PATENT DOCUMENTS

| | | | | |
|---|---|---|---|---|
| 4,584,639 A * | 4/1986 | Hardy | ............................... | 726/2 |
| 5,063,499 A * | 11/1991 | Garber | ............................ | 703/27 |
| 5,371,890 A * | 12/1994 | Bozman et al. | ............... | 719/312 |
| 5,493,663 A * | 2/1996 | Parikh | ........................... | 711/159 |
| 6,085,296 A * | 7/2000 | Karkhanis et al. | ............ | 711/147 |
| 6,298,422 B1 * | 10/2001 | Spilo et al. | .................... | 711/154 |
| 2007/0118712 A1 * | 5/2007 | van Riel et al. | ............... | 711/170 |

OTHER PUBLICATIONS

IBM. Minimizing Input Output Page Pinning in a Virtual Storage Data Processor. IBM Technical Disclosure Bulletin, vol. 19, Issue 1 (Jun. 1, 1976), pp. 83-84.*

* cited by examiner

*Primary Examiner* — Jared Rutz
*Assistant Examiner* — Larry Mackall
(74) *Attorney, Agent, or Firm* — Wilmer Cutler Pickering Hale and Dorr LLP

(57) ABSTRACT

A method and apparatus for mitigating the performance impact of background or idle time processing during interactive computing sessions. One embodiment of the present invention is a method for mitigating performance impact of background or idle time processing on interactive applications comprising identifying executable and data pages in physical memory that are associated with an interactive application that is temporarily unused and preventing any of the identified executable and data pages from paging out.

20 Claims, 3 Drawing Sheets

METHOD AND APPARATUS FOR MITIGATING PERFORMANCE IMPACT OF BACKGROUND PROCESSING ON INTERACTIVE APPLICATION

CROSS-REFERENCE TO RELATED APPLICATIONS

This application claims benefit of U.S. provisional patent application Ser. No. 60/976,418, filed Sep. 29, 2007, which is herein incorporated by reference.

BACKGROUND OF THE INVENTION

1. Field of the Invention

Embodiments of the present invention generally relate to computer memory management and, more particularly, to a method and apparatus for mitigating performance impact of idle or background processing on interactive applications.

2. Description of the Related Art

In a computing environment, many tasks or processes are performed in the background or during idle time. For example, tasks or processes are performed invisibly or when the user is not actively involved with an interactive application for some period of time. Many of the tasks or processes are non-critical but time, memory and/or processor-intensive activities (e.g., backup programs, scheduled jobs, cleaning files, Anti-Virus scan, screen saver program, web page serving, email transfer processes, file synchronization, among others).

Often, such background or idle tasks or processes cause the working sets of executable and data pages associated with the interactive applications to become "paged-out" of the local memory (i.e., removed from local memory, such as RAM). For example, the working set may be paged out to free up memory for the working set associated with the background or idle tasks or processes. However, when the user returns to using the interactive application, a significant amount of sluggishness is experienced due to the subsequent "paging in" of the working set of the interactive application that was previously paged out. The manner in which memory pages are managed in a Windows environment are described in an article entitled "The NT Insider, Vol. 6, Issue 1, January-February 1999, published in "Windows NJ Virtual Memory (Part II)".

Therefore, there exists a need for a method and apparatus of mitigating the adverse performance impact of background or idle time processing on interactive applications.

SUMMARY OF THE INVENTION

Embodiments of the present invention generally relate to a method and apparatus for mitigating the performance impact of background or idle time processing during interactive computing sessions. One embodiment of the present invention is a method for mitigating performance impact of background or idle time processing on interactive applications comprising identifying executable and data pages in physical memory that are associated with an interactive application and preventing the identified executable and data pages from paging out.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

While the invention is described herein by way of example using several embodiments and illustrative drawings, those skilled in the art will recognize that the invention is not limited to the embodiments of drawing or drawings described. It should be understood that the drawings and detailed description thereto are not intended to limit the invention to the particular form disclosed, but on the contrary, the invention is to cover all modification, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. Further, the word "a" means at least one.

DETAILED DESCRIPTION

Figure 1:
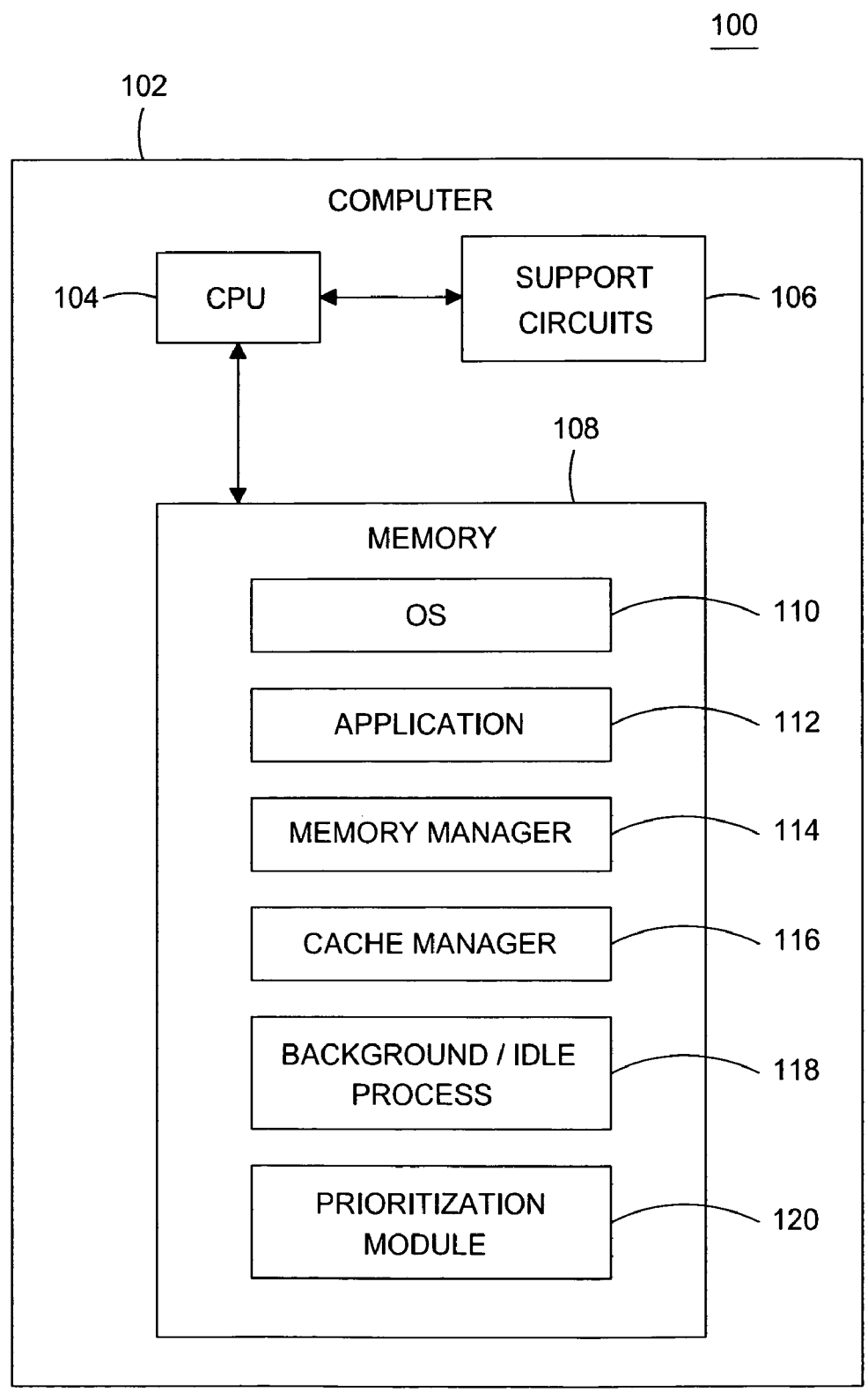
FIG. 1 is a block diagram of a computer system according to various embodiments of the present invention.

FIG. 1 is a block diagram of a computer 102 according to various embodiments of the present invention. The computer 102 comprises, without limitation, a central processing unit (CPU) 104, support circuits 106, and a memory 108. The CPU 104 may be one or more of any commercially available microprocessors or microcontrollers. The support circuits 106 facilitate the operation of the CPU 104. For example, the CPU 104 and the memory 108 are inter-connected through the support circuits 106. The support circuits 106 include, for example, input/output circuits, system bus, PCI bus, clock circuits, power supplies and the like. Those skilled in the art will appreciate that the hardware depicted in the FIG. 1 may vary from one computer system to another. For example, other peripheral devices, such as optical disk drives, graphics card, data storage devices, various other input devices, peripherals and the like, may also be used in addition to or in place of the hardware depicted.

The memory 108 may comprise random access memory, read only memory, optical memory, disk drives, removable memory, and the like. Various types of software packages and information are resident within the memory 108. For example, an operating system 110, an interactive application 112, a memory manager 114, a cache manager 116, a background/idle process 118 and a prioritization module 120 are stored in the memory 108.

The operating system 110 manages the allocation or sharing of various resources (e.g., local memory, data storage devices, processors and the like) of the computer 102. The operating system 110 processes raw system data and user input, and responds by allocating and managing tasks and internal system resources as a service to users and programs of the system. It performs basic tasks such as controlling and allocating memory, prioritizing system requests, controlling input and output devices, facilitating networking and managing file systems. Most operating systems come with an application that provides a user interface for managing the operating system.

The interactive application 112 may be any application of interest to the user of computer 102 (e.g., word processing, e-mail software and the like). The interactive application 112 may have one or more windows visible at a display of the computer 102 that are actively receiving input and utilizing resources (e.g., CPU time) from the operating system 110.

In addition, the computer 102 may execute certain applications in the background or during idle time which are not visible to the user of computer 102 (e.g., the background/idle process 118). Many of these applications are non-critical but are time and computing-intensive activities (e.g., backup programs, scheduled tasks, updating of an Anti-Virus clean file cache, performing an Anti-Virus scan, screen saver program, web page access, email transfer, file synchronization and the like). For example, an anti-virus application may scan the memory 108 when the interactive application 112 becomes idle for some period of time.

The memory manager 114 provides the operating system 110 with dynamic memory allocation. The memory manager 114 processes read/write requests by the operating system 110, the interactive application 112, the background/idle process 118 and any other application or process that uses the memory 108. Generally, a working set is used by the memory manager 114 to keep track of the pages that are associated with any given application. Each time a new data and executable page is allocated to a given process, the page is added to its working set. Thus, the memory manager 114 controls an amount of physical memory each process or application consumes. The working set of executable and data pages associated with the interactive application 112 may be modified and/or prioritized through operation of the memory manager 114, and/or the prioritization module 120 according to embodiments of the present invention.

The cache manager 116 manages the random access memory that is set aside as specialized temporary buffer storage that is continually updated. This memory is used to optimize data transfers between system elements with different characteristics. The cache manager 116 cooperates with the memory manager 114 to control the swapping (i.e., paging in and paging out) of data between various levels of memory (e.g., swapping pages between a disk drive and local memory).

The prioritization module 120 may be a software package stored and executed by the computer 102. The prioritization module 120 is configured to identify one or more data and executable pages associated with the interactive application 112 and prevent the identified pages from paging out. Alternatively, the prioritization module 120 may form a portion of the background/idle process 118. In one embodiment, the prioritization module 120 is used to mitigate the performance impact of the background/idle process 118 (e.g., an anti-virus scan executed in idle time) on the interactive application 112. In another alternative embodiment, the prioritization module 120 may be included within the operating system 110 and/or the memory manager 114. In such embodiments, the prioritization module 120 is implemented as a modification to the paging scheme (e.g., swapping, page fault handing) of the operating system 110 and/or the memory manager 114.

When a process is first created, it is assigned two physical memory-related quotas: a minimum working set size and a maximum working set size. The exact values of these two quotas vary over time and may even be changed programmatically.

Because physical memory must be shared between all processes within the system, the memory manager 114 is used to reclaim executable and data pages from some processes to make those pages available to other processes. By reclaiming physical memory, a process that is idle or presently unused may have pages become "paged out" of the memory. As described in detail below, the present invention controls the page out process to protect certain pages.

Figure 2:
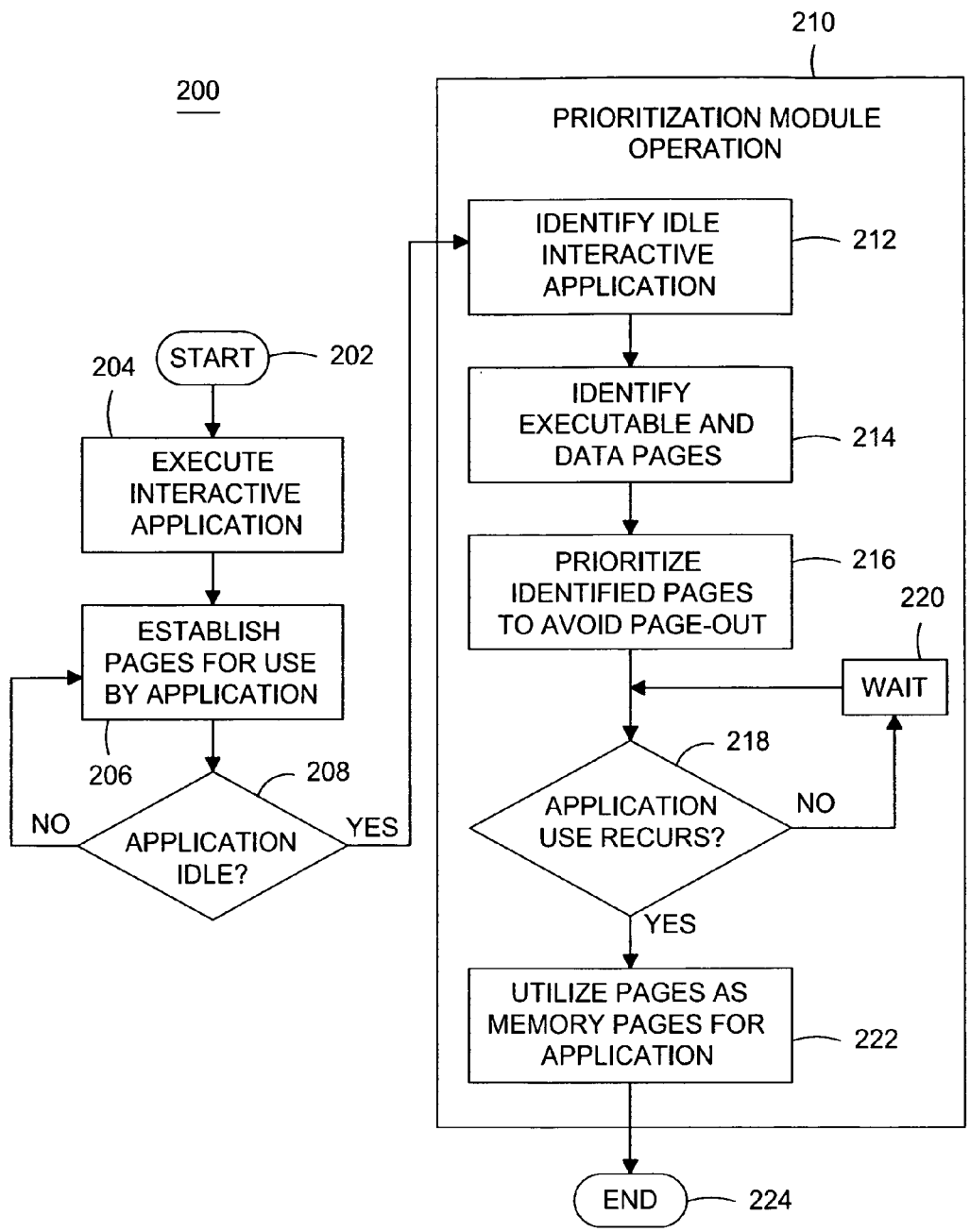
FIG. 2 is a flow diagram of a method for mitigating performance impact of background or idle time processing on interactive applications according to various embodiments of the present invention.

FIG. 2 is a flow chart of method 200, for mitigating performance impact of background or idle time processing on interactive applications according to various embodiments of the present invention. The method 200 begins at step 202 and proceeds to step 204.

In step 204, an interactive application is executed and loaded into a memory (e.g., the memory 108 of the computer 102). In step 206, the memory manager 114 allocates space for pages required by the interactive applications (e.g., the memory manager 114 allocates page space for the interactive application 112). In step 208, a determination is made as to whether the interactive application 112 is idle or presently unused (e.g., the user is not actively engaged with the interactive application 112). If the interactive application 112 is actively being used (option "No"), the method 200 returns to step 206 where the user continues to use the interactive application 112 and access the pages established by the memory manager 114 for the interactive application 112. If the interactive application 112 is idle (option "Yes"), the method 200 proceeds to step 210. At step 210, the method 200 executes the prioritization module 120 operation as shown.

In step 212, the first task for the prioritization module 120 operation is the identification of an idle interactive application (e.g., the interactive application 112). Then, at step 214, the memory manager 114 will identify and enumerate executable and data pages that are associated with active use of the now idle interactive application 112 (e.g., the established executable and data pages or working set from step 206). The user can profile the paging characteristics of the interactive application 112 over various sampling schemes (such as during periods of activity or at regular intervals over the entire lifetime of a typical application session).

Next, at step 216, the prioritization module 120 in conjunction with the memory manager 114 prevents one or more of the identified pages from paging out. In one embodiment, the identified pages are prioritized to indicate that the identified pages are least likely to be paged out by the memory manager 114. In another embodiment, the identified pages are prioritized by modifying page table entries related to the identified pages (e.g., using the memory manager 114 as described herein). In yet another embodiment, the identified pages are prioritized by injecting a user-mode thread into a virtual address space of the interactive application 112 where the user-mode thread periodically accesses the identified pages. Accordingly, the memory manager 114 views the pages as "fresh" and will not page out the fresh pages.

At step 218, a determination is made as to whether use of the interactive application 112 has recurred. The computer 102 will wait (option "No") and allow background or idle processing to occur (e.g., by the background/idle process 118) if the interactive application 112 remains idle (e.g., use of the interactive application 112 has not recurred). At step 222, if use of the interactive application 112 recurs, the prioritization module 120 will return the modified identified pages (e.g., pages that were protected from paging out) to their original paging state. For example, the access bit, the dirty bit and any other information used to describe each of the identified pages within each page table entry will return to the original settings or markings in place before the completion of step 216 by the prioritization module 120. Since the identified pages have been prevented from being paged out (e.g., prioritized) and are still resident in the memory 108, the identified pages may be loaded spontaneously. Thus, sluggishness normally attributed to the subsequent paging in of any of the identified pages upon recurrence of use of the interactive application 112 is lessened if not eliminated.

Figure 3:
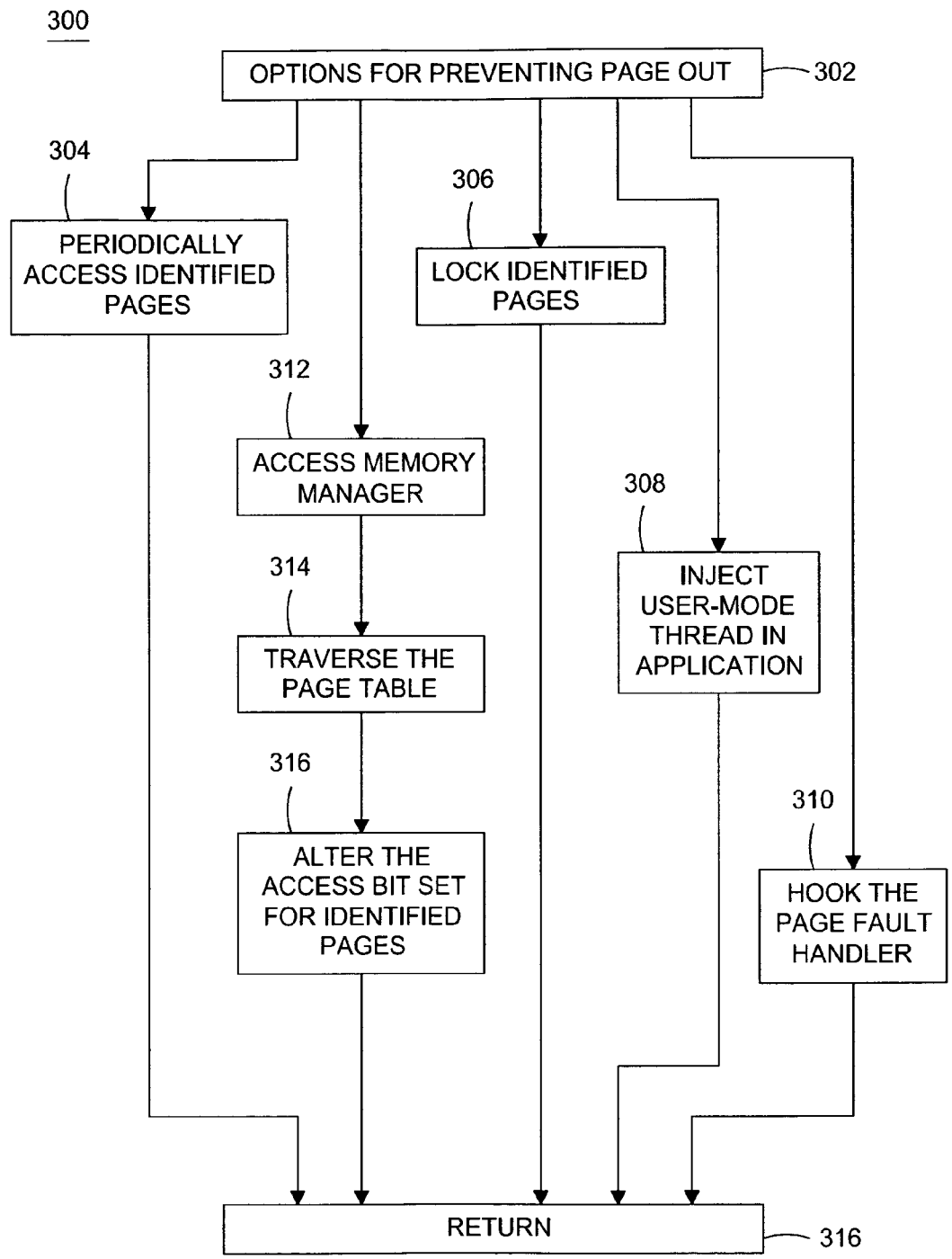
FIG. 3 is a flow diagram of a method for prioritizing identified pages according to various embodiments of the present invention.

FIG. 3 is a flow diagram a method 300 for preventing executable and data pages from paging out according to various embodiments of the present invention. The method 300 is executed in step 216 to prevent any of the pages associated with the interactive application 112 from being paged out by the memory manager 114 while the background or idle process 118 is executing (e.g., by prioritizing or modifying the paging scheme). At step 302, the method 300 selects an option to use for preventing the pages from paging out.

According to one embodiment, the method 300 selects a first option and proceeds to step 304. At step 304, the pages are periodically accessed to avoid being paged out. Thus, the pages would appear to be important and/or "fresh" to the cache manager 116 and not be paged out. Then, the method 300 proceeds to step 318 where the method 300 returns to step 216 in the method 200.

According to another embodiment, the method 300 selects a second option and proceeds to step 306. At step 306, the identified pages are locked in order to prevent the identified pages from being paged out. Alternatively, the identified pages could be marked as non-pageable. Both may be achieved using an Application Programming Interface (API) designed to manipulate the data and executable pages. Then, the method 300 proceeds to step 318 where the method 300 returns to step 216 in the method 200.

According to yet another embodiment, the method 300 selects a third option and proceeds to step 308. At step 308, a user-mode thread is injected into the virtual address space of the interactive application 112. The identified pages are accessed from within the virtual address space of the interactive application 112. Accordingly, the user-mode thread prioritizes the identified pages by periodically accessing the identified pages. Then, the method 300 proceeds to step 318 where the method 300 returns to step 216 in the method 200.

Alternatively, the method 300 selects a fourth option and proceeds to step 310. At step 310, a page fault handler (e.g., associated with the memory manager 114 and/or the operating system 110) is "hooked" to modify the paging scheme and prioritize the pages associated with the interactive application 112. In one embodiment, the hooked page fault handler may issue a page fault when a page cannot be accessed because the page is either invalid or not present in local memory. Then, instead of swapping any of the identified pages (e.g., lowest priority or least recently used page) with a page from a disk drive during the page fault, the prioritization module 120 prevents the page fault handler from paging out the identified page. In one embodiment, the page fault handler pages out another page that is not associated with the interactive application 112. Then, the method 300 proceeds to step 318 where the method 300 returns to step 216 in the method 200.

In one embodiment, the method 300 selects a fifth option and proceeds to step 312. At step 312, the memory manager 114 is accessed to traverse the page table at step 314. In one embodiment, the prioritization module 120 cooperates with the memory manager 114 to modify the page table entries related to the identified pages to reduce the likelihood that the identified paged will be paged out. At step 316, the memory manager 114 marks the identified pages as "accessed" by altering the access bit of the related page table entries. At step 316, if the page has the "accessed" bit set, then the memory manager 114 clears the bit but does not remove the page from the working set (e.g., the page remains valid). Then, the method 300 proceeds to step 318 where the method 300 returns to step 216 in the method 200.

While the foregoing is directed to embodiments of the present invention, other and further embodiments of the invention may be devised without departing from the basic scope thereof, and the scope thereof is determined by the claims that follow.

What is claimed is:

1. A method for mitigating performance impact of background or idle time processing on interactive applications comprising:
   identifying, using a prioritization executable executing on physical memory, executable and data pages in the physical memory that are associated with an interactive application that is presently unused;
   selecting, using the prioritization executable, a page out prevention technique from a plurality of page out prevention techniques, wherein the plurality of page out prevention techniques is stored in memory and available to the prioritization executable; and
   preventing, by at least one of modifying or prioritizing the identified executable and data pages, the identified executable and data pages from paging out using the selected page out prevention technique.

2. The method of claim 1, further comprising utilizing the identified executable and data pages when use of the interactive application recurs.

3. The method of claim 1, wherein the preventing step comprises locking the identified executable and data pages.

4. The method of claim 1, wherein the preventing step comprises marking the identified executable and data pages as non-pageable.

5. The method of claim 1, wherein the preventing step further comprises periodically accessing the identified executable and data pages.

6. The method of claim 1, wherein the preventing step further comprises injecting a usermode thread into the address space of the interactive application to periodically access the identified executable and data pages.

7. The method of claim 1, wherein the preventing step further comprises modifying page table entries related to the identified executable and data pages to avoid paging out of the identified executable and data pages.

8. The method of claim 7, wherein the modifying step further comprises traversing a page table to mark the identified executable and data pages as accessed.

9. The method of claim 8, wherein the traversing step further comprises altering an access bit set for any of the identified executable and data pages.

10. The method of claim 1, wherein the step of preventing further comprises hooking a page fault handler to prevent any of the identified executable and data pages from paging out upon an occurrence of a page fault.

11. The method of claim 10, wherein the hooking step further comprises adjusting a size of a working set associated with the interactive application.

12. The method of claim 10, wherein the hooking step further comprises preventing a reduction in a size of a working set associated with the interactive application.

13. The method of claim 1, wherein the prioritization executable and the interactive application operate independently of each other.

14. A method for mitigating performance impact of background or idle time processing on interactive applications comprising:
- detecting, using a prioritization executable executing on physical memory, an interactive application that is presently unused;
- identifying executable and data pages in the physical memory that are associated with the interactive application; and
- selecting, using the prioritization executable, a page out prevention technique from a plurality of page out prevention techniques, wherein the plurality of page out prevention techniques is stored in memory and available to the prioritization executable,
- prioritizing the identified executable and data pages to avoid paging out during the background or idle time processing using the selected page out prevention technique.

15. The method of claim 14, further comprising upon completion of the background or idle processing, returning the identified executable and data pages to a paging state prior to the background or idle processing.

16. An apparatus for mitigating performance impact of background or idle time processing on interactive applications comprising:
- a memory comprising a plurality of data and executable pages; and
- a prioritization module for identifying an executable and data page associated with an interactive application that is presently unused, selecting a page out prevention technique from a plurality of page out prevention techniques, and preventing, by at least one of modifying or prioritizing the identified executable and data page, the identified executable and data page from being paged out while a background or idle process is being executed using the selected page out prevention technique, wherein the plurality of page out prevention techniques is stored in memory and available to the prioritization executable.

17. The apparatus of claim 16, wherein the prioritization module periodically accesses the identified executable and data page.

18. The apparatus of claim 16, wherein the prioritization module injects a user-mode thread into a virtual address space of the interactive application wherein the usermode thread periodically accesses the identified executable and data page.

19. The apparatus of claim 16, further comprising a memory manager to traverse a page table to mark the identified executable and data page as accessed.

20. The apparatus of claim 16, wherein the prioritization module hooks a page fault handler before the identified page is paged out upon an occurrence of a page fault.

* * * * *